(12) United States Patent
Nakielski et al.

(10) Patent No.: US 11,697,454 B2
(45) Date of Patent: Jul. 11, 2023

(54) VARIABLE TRAVEL STOP TO INCREASE WORM GEAR DURABILITY

(71) Applicant: Steering Solutions IP Holding Corporation, Saginaw, MI (US)

(72) Inventors: Marcin J. Nakielski, Sosnowiec (PL); Jakub Franiasz, Chorzow (PL); Kamil Chodur, Tychy (PL)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/203,973

(22) Filed: Mar. 17, 2021

(65) Prior Publication Data

US 2021/0300465 A1    Sep. 30, 2021

(30) Foreign Application Priority Data

Mar. 27, 2020 (PL) .......................... 433362

(51) Int. Cl.
| | | |
|---|---|---|
| *B62D 5/04* | (2006.01) | |
| *F16H 1/16* | (2006.01) | |
| *H02P 23/24* | (2016.01) | |
| *H02K 7/116* | (2006.01) | |
| *H02P 23/18* | (2016.01) | |

(52) U.S. Cl.
CPC ............ *B62D 5/0469* (2013.01); *F16H 1/16* (2013.01); *H02K 7/1166* (2013.01); *H02P 23/183* (2016.02); *H02P 23/24* (2016.02); *B62D 5/0409* (2013.01)

(58) Field of Classification Search
CPC ..... B62D 5/0469; H02P 23/183; H02P 23/24; F16H 1/16; H02K 7/1166
See application file for complete search history.

(56) References Cited

U.S. PATENT DOCUMENTS

| | | |
|---|---|---|
| 6,354,395 B1 | 3/2002 | Cheng et al. |
| 6,578,444 B1 | 6/2003 | Wendelin |
| 7,174,987 B2 | 2/2007 | Husain |

(Continued)

FOREIGN PATENT DOCUMENTS

| | | |
|---|---|---|
| CN | 105730504 A | 7/2016 |
| CN | 106080759 A | 11/2016 |

(Continued)

OTHER PUBLICATIONS

First Office Action regarding corresponding CN App. No. 202110335833.3; dated Nov. 16, 2022.

*Primary Examiner* — Said Bouziane
(74) *Attorney, Agent, or Firm* — Dickinson Wright PLLC (57) ABSTRACT

Technical solutions are described for controlling operation of a motor using a controller to: energize the motor to rotate driveshaft and a worm; drive a worm gear by the worm; stop the motor from rotating the driveshaft in response to the worm gear rotating to a given one of a plurality of first stop positions; and change the given one of the first stop positions to another one of the first stop positions. A method for controlling a machine comprises: rotating a driveshaft by a motor; driving a worm gear by a worm to cause the worm gear to rotate; stopping the motor from rotating the driveshaft in response to the worm gear rotating to a given one of a plurality of first stop positions; and changing the given one of the first stop positions to another one of the first stop positions.

20 Claims, 4 Drawing Sheets

(56) References Cited

U.S. PATENT DOCUMENTS

| | | | |
|---|---|---|---|
| 8,880,295 B2 | 11/2014 | Champagne et al. | |
| 2007/0227279 A1* | 10/2007 | Watanabe | B62D 5/0409 74/89.14 |
| 2016/0221601 A1* | 8/2016 | Barthomeuf | B60R 25/02 |

FOREIGN PATENT DOCUMENTS

| | | |
|---|---|---|
| CN | 105324291 B | 9/2017 |
| CN | 108749917 A | 11/2018 |
| EP | 1216438 B1 | 11/2007 |

* cited by examiner

VARIABLE TRAVEL STOP TO INCREASE WORM GEAR DURABILITY

CROSS REFERENCE TO RELATED APPLICATIONS

This U.S. utility patent application claims the benefit of Polish (PL) Patent Application No. P.433362, filed Mar. 27, 2020 the contents of which is incorporated herein by reference in its entirety.

BACKGROUND

The present application is generally related to methods and systems for machines that include a worm gear, and more particularly to methods and systems for controlling a motor to stop a worm gear at a predetermined stop position.

A number of different machines and machine components include a controller that controls a motor to drive a load using a worm gear. One example of a machine having such a configuration is in an electric power steering (EPS) system of a motor vehicle.

Worm gear durability depends on the highest loads applied to the worm gear, which are commonly applied when the worm gear is at an end-of-travel (EOT) position. Worm gear durability fatigue limit is related to loading one or more teeth of the worm gear at each of two EOT positions which correspond to the worm gear being driven in each of two opposite directions (e.g. clockwise and counter-clockwise).

SUMMARY

According to one or more embodiments, a control system for controlling operation of a motor comprises a processor; and memory that includes instructions that, when executed by the processor, cause the processor to: energize the motor to rotate a driveshaft; drive a worm gear by a worm coupled to the driveshaft to cause the worm gear to rotate in a first direction; stop the motor from rotating the driveshaft in response to the worm gear rotating in the first direction to a given one of a plurality of first stop positions; and change the given one of the plurality of first stop positions to another one of the plurality of first stop positions.

According to one or more embodiments, a method for controlling a machine comprises the steps of: rotating a driveshaft by a motor; driving a worm gear by a worm coupled to the driveshaft to cause the worm gear to rotate in a first direction; stopping the motor from rotating the driveshaft in response to the worm gear rotating in the first direction to a given one of a plurality of first stop positions; and changing the given one of the first stop positions to another one of the first stop positions.

According to one or more embodiments, a method for controlling a power steering system in a vehicle comprises the steps of: rotating a driveshaft by a motor; driving a worm gear by a worm coupled to the driveshaft to cause the worm gear to rotate in a first direction; stopping the motor from rotating the driveshaft in response to the worm gear rotating in the first direction to a given one of a plurality of first stop positions; and changing the given one of the plurality of first stop positions to another one of the plurality of first stop positions.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
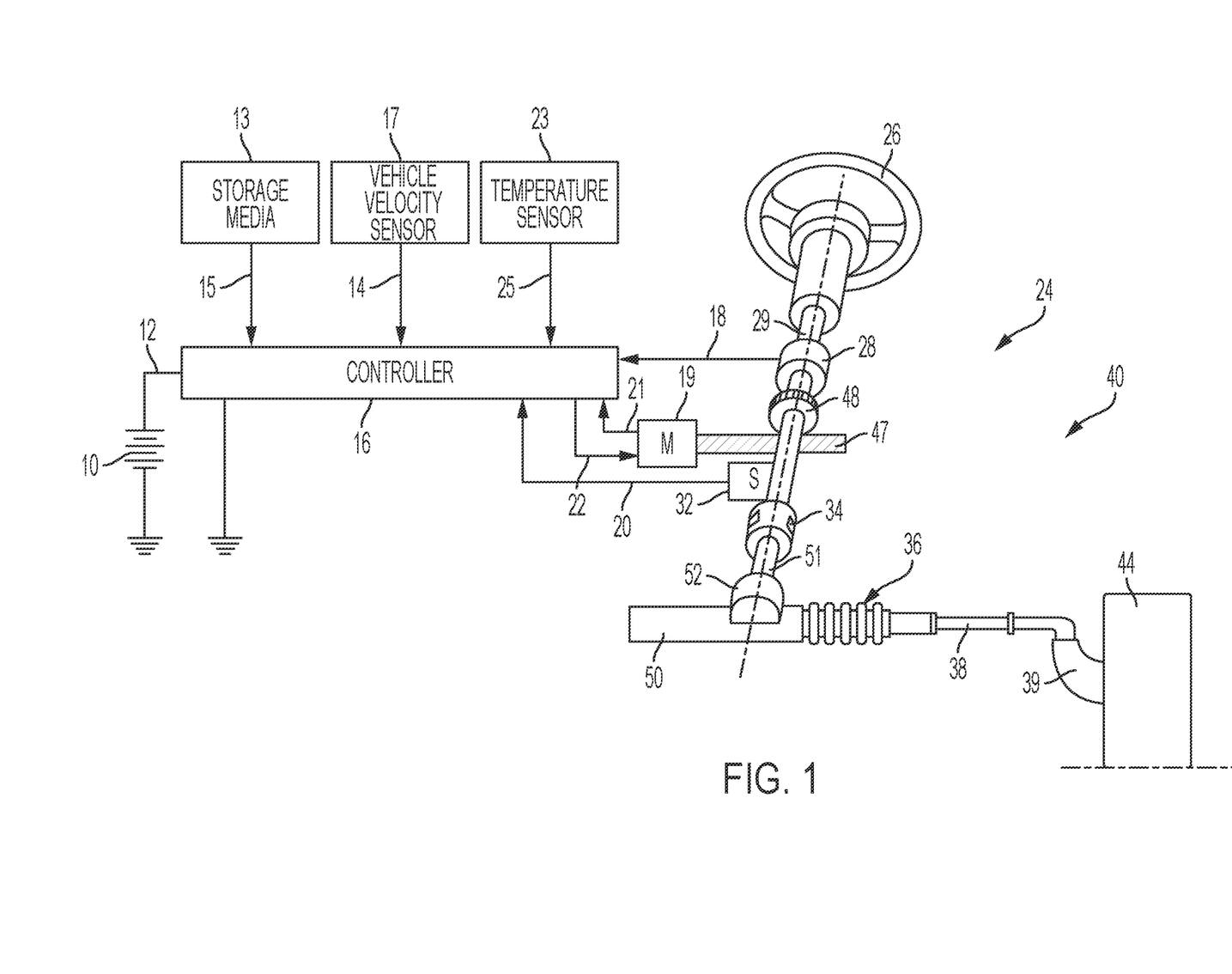
FIG. 1 depicts a block diagram of an exemplary embodiment of an electric power steering system according to aspects of the present disclosure.

Referring now to the figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g., a hand wheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor (PMSM), and is hereinafter denoted as electric machine 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity, denoted $\omega_m$, may be measured, calculated or a combination thereof. The motor velocity $\omega_m$ may be derived from motor position θ as the rate of change of position θ with respect to time. For example, the motor velocity om may be calculated as the change of the motor position θ, as measured by a position sensor 32 over a prescribed time interval. The motor velocity om may be determined using a derivative of the motor position θ from the equation $\omega_m=\Delta\theta/\Delta t$, where $\Delta t$ is a sampling time interval and $\Delta\theta$ is the change in position during the sampling time interval. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the motor 19 and the desired torque, the position and/or speed of the rotor and the torque applied by an operator are determined. A position encoder is connected to the lower steering shaft 51 or at an end of the motor 19 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the foregoing. The position encoder outputs a position signal 20 indicating the angular position of the lower steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time-based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), the controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Figure 2:
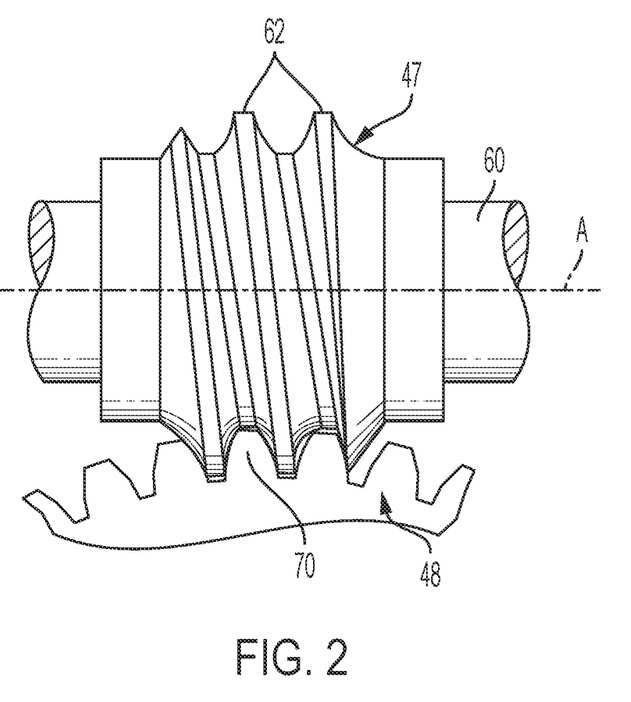
FIG. 2 depicts a worm engaging a worm gear according to aspects of the present disclosure.

FIG. 2 shows a worm 47 engaging a worm gear 48. Specifically, FIG. 2 shows a driveshaft 60 that is coupled to the worm 47, with the worm 47 including helical gear tooth 62 that extends helically around the driveshaft 62. FIG. 2 also shows the helical gear tooth 62 of the worm 47 engaging three gear teeth 70 of the worm gear 48. It should be appreciated that the helical gear tooth 62 of the worm 47 may have another size or shape that engages more than or fewer than the three gear teeth 70 of the worm gear 48. In operation, the controller 16 energizes the motor 19 (not shown in FIG. 2), causing the driveshaft 60 to rotate about axis A, thus rotating the worm 47. This rotation of the worm 47 drives the worm gear 48 to rotate. It should be appreciated that the worm gear 48 may be driven in either of two opposite direction. For example, the worm gear 48 may be driven to rotate in either a clockwise (CW) or a counter-clockwise (CCW) direction by driving the motor 19 and the worm 47 in either of two opposite directions.

Figure 3:
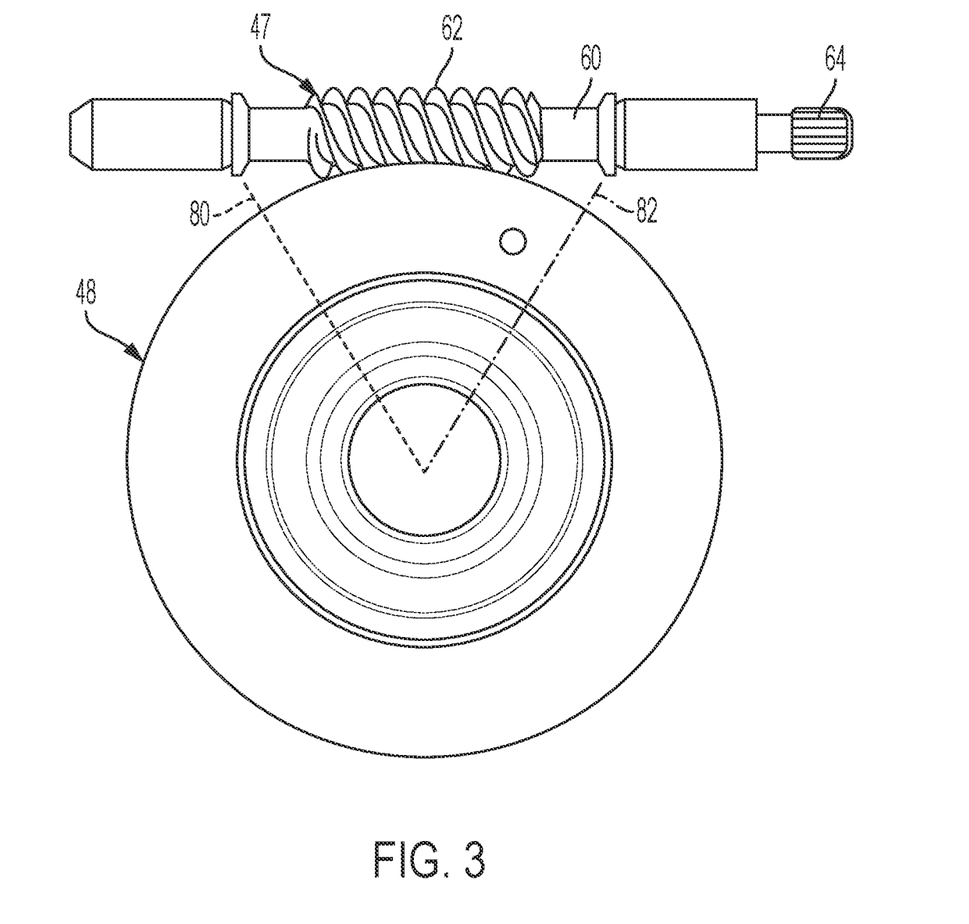
FIG. 3 depicts a gear set including a worm and a worm gear according to aspects of the present disclosure.

FIG. 3 shows a gear set including a worm 47 and a worm gear 48 according to aspects of the present disclosure. The provided gear set may be used any of many different machines or machine applications. For example, the provided gear set may be used in the electric power steering system (EPS) 40. The driveshaft 60 includes a connection portion 64, such as a splined region, for connection to a motor 19.

A first stop position 80 is shown as a radial line overlying the worm gear 48. The first stop position 80 represents an end-of-travel (EOT) rotational position of the worm gear 48 for the worm gear 48 moving in a first direction (e.g. clockwise). A second stop position 82 is shown as a radial line overlying the worm gear 48. The second stop position 82 represents an end-of-travel (EOT) rotational position for the worm gear 48 moving in a second direction opposite the first direction (e.g. counter-clockwise). The stop positions 80, 82 may represent a position where the worm gear 48 must be stopped to prevent over-travel of the steering system and/or stressing system components that can result from applying torque by the motor 19 against a mechanical stop that limits travel of the system. The worm gear 48 can experience highest torque loads at or near the stop positions 80, 82. This is related to the highest force needed at the EOT locations to move the wheels. Steering rack forces occurring from parking are crucial for the dimensioning of a steering system, which includes forces transmitted to the worm gear 48. The overall displacement force of the rack is the sum of the left and right tie rod forces. Essential influences on the level of the rack force at parking are the axle kinematics, the front axle load, the size of the tires, the air pressure in the tires and the friction value of the road surface.

In an example configuration, the controller 16 energizes the motor 19 to rotate the driveshaft 60 which turns the worm 47. The worm 47, then drives the worm gear 48, causing the worm gear 48 to rotate. The controller 16 may stop the motor 19 from rotating the driveshaft 60, and thus stop driving the worm gear 48, in response to the worm gear rotating to a corresponding one of the stop positions 80, 82. For example, the motor 19 may be stopped from driving the worm gear 48 in the first direction once the worm gear 48 rotates to or beyond the first stop position 80. Similarly, the motor 19 may be stopped from driving the worm gear 48 in the second direction once the worm gear 48 rotates to or beyond the second stop position 82.

Figure 4:
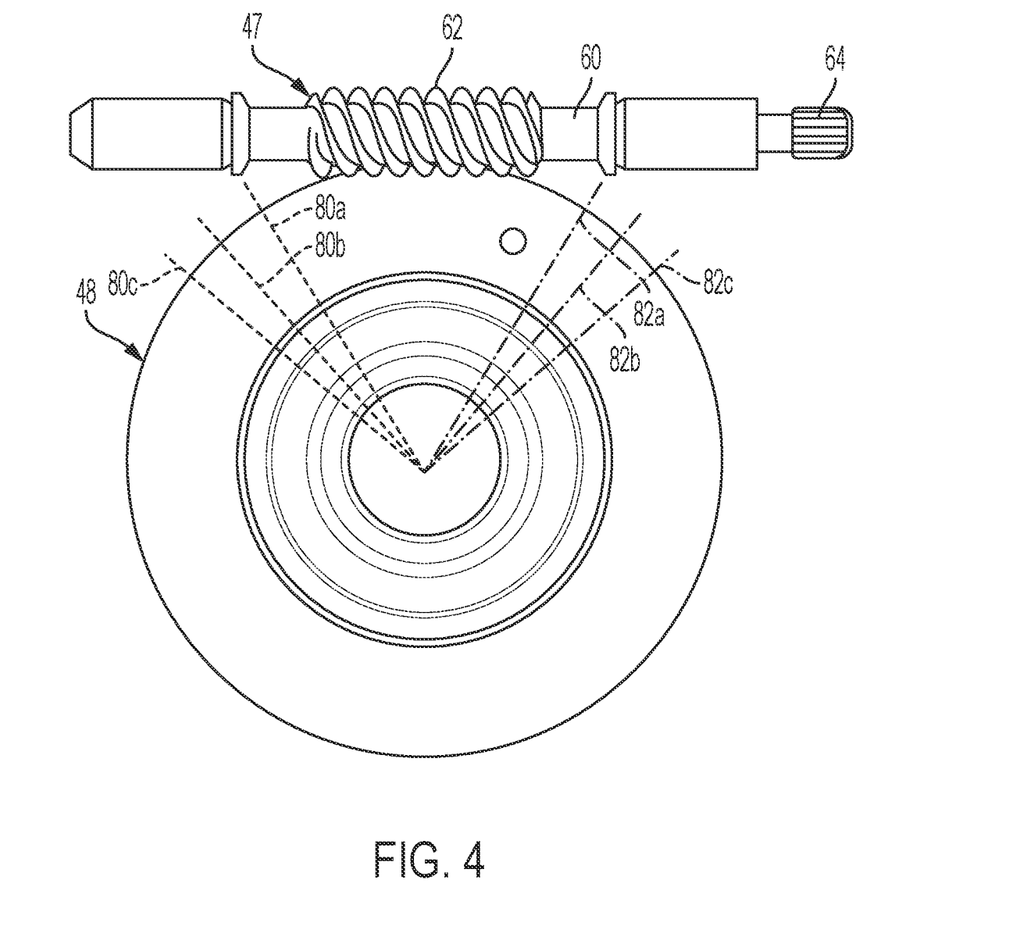
FIG. 4 depicts the gear set of FIG. 3 with a plurality of first stop positions and a plurality of second stop positions.

FIG. 4 depicts the gear set of FIG. 3 with a plurality of first stop positions 80a, 80b, 80c, and a plurality of second stop positions 82a, 82b, 82c. Specifically, FIG. 4 shows a gear set of the present disclosure including three first stop positions 80a, 80b, 80c, and three second stop positions 82a, 82b, 82c. However, the plurality of first stop positions may include any number of two or more first stop positions, and the plurality of second stop positions may include any number of two or more second stop positions.

The first stop positions 80a, 80b, 80c may be angularly spaced apart from one another my any amount. In some embodiments, the first stop positions 80a, 80b, 80c each correspond to different gear teeth 70 of the worm gear 48. In one example embodiment, the first stop positions 80a, 80b, 80c are spaced apart from one another by one or more gear teeth 70 of the worm gear 48. In some embodiments, the first stop positions 80a, 80b, 80c are spaced apart from one another by two or more gear teeth 70 of the worm gear 48. Because the worm 47 can mechanically interact with two or more of the gear teeth 70 of the worm gear 48 at any given time, as shown in FIG. 2, it can be advantageous in spreading wear on the worm gear 48 to space the first stop positions 80a, 80b, 80c by a greater amount. For example, a gear tooth 70 may engage the worm 47 at two different first stop positions 80a, 80b, 80c that are spaced apart from each other by one gear teeth 70 of the worm gear 48, but the same gear tooth 70 may not engage the worm 47 at two different first stop positions 80a, 80b, 80c that are spaced apart from each other by two gear teeth 70 of the worm gear 48.

The second stop positions 82a, 82b, 82c may be angularly spaced apart from one another my any amount. In some embodiments, the second stop positions 82a, 82b, 82c each correspond to different gear teeth 70 of the worm gear 48. In one example embodiment, the second stop positions 82a, 82b, 82c are spaced apart from one another by one or more gear teeth 70 of the worm gear 48. In some embodiments, the second stop positions 82a, 82b, 82c are spaced apart from one another by two or more gear teeth 70 of the worm gear 48. Because the worm 47 can mechanically interact with two or more of the gear teeth 70 of the worm gear 48 at any given time, as shown in FIG. 2, it can be advantageous in spreading wear on the worm gear 48 to space the second stop positions 82a, 82b, 82c by a greater amount. For example, a gear tooth 70 may engage the worm 47 at two different second stop positions 82a, 82b, 82c that are spaced apart from each other by one gear teeth 70 of the worm gear 48, but the same gear tooth 70 may not engage the worm 47 at two different second stop positions 82a, 82b, 82c that are spaced apart from each other by two gear teeth 70 of the worm gear 48.

The system may be configured to rotate or alternate between different ones of the first stop positions 80a, 80b, 80c, and/or different ones of the second stop positions 82a, 82b, 82c. In some embodiments, the system is configured to change to a different one of the first stop positions 80a, 80b, 80c each time the worm gear is driven away from the first stop positions 80a, 80b, 80c. For example, a given one of the first stop positions 80a, 80b, 80c to be used for stopping the worm gear 48 may be changed every time the worm gear 48 is rotated beyond all of the first stop positions 80a, 80b, 80c (i.e. toward the second stop positions 82a, 82b, 82c). Alternately, the given one of the first stop positions 80a, 80b, 80c to be used for stopping the worm gear 48 may be changed every time the worm gear 48 is rotated beyond some other predetermined position. In some embodiments, changing the given one of the first stop positions 80a, 80b, 80c to be used for stopping the worm gear 48 to another one of the first stop positions 80a, 80b, 80c comprises changing the given one of the first stop positions 80a, 80b, 80c in a predetermined pattern. For example, the stop positions may be rotated in a repeating pattern (e.g. a,b,c, a,b,c, . . . , or a,b,a,b, . . . ).

Similarly, the system may be configured to change to a different one of the second stop positions 82a, 82b, 82c each time the worm gear is driven away from the second stop positions 82a, 82b, 82c. For example, a given one of the second stop positions 82a, 82b, 82c to be used for stopping the worm gear 48 may be changed every time the worm gear 48 is rotated beyond all of the second stop positions 82a, 82b, 82c (i.e. toward the first stop positions 80a, 80b, 80c). Alternately, the given one of the second stop positions 82a, 82b, 82c to be used for stopping the worm gear 48 may be changed every time the worm gear 48 is rotated beyond some other predetermined position. In some embodiments, changing the given one of the second stop positions 82a, 82b, 82c to be used for stopping the worm gear 48 to another one of the second stop positions 82a, 82b, 82c comprises changing the given one of the second stop positions 82a, 82b, 82c in a predetermined pattern. For example, the stop positions may be rotated in a repeating pattern (e.g. a,b,c, a,b,c, . . . or a,b,a,b, . . . ).

The one of the first stop positions 80a, 80b, 80c and/or the one of the second stop positions 82a, 82b, 82c to be used for stopping the worm gear 48 may be changed using a different method, such as on a periodic time basis.

Table 1 shows the effects on the variation in handwheel positions of a single-pinion electric power steering (SPEPS) with a plurality of stop positions that are spaced-apart by 2 gear teeth 70 on the worm gear 48. Specifically, Table 1 shows stop positions spaced-apart by 2 gear teeth 70 corresponding to a handwheel variation of +/−10°. Table 2 shows the effects on the variation in handwheel positions of a dual-pinion electric power steering (DPEPS) with a plurality of stop positions that are spaced-apart by 2 gear teeth 70 on the worm gear 48. Specifically, Table 2 shows stop positions spaced-apart by 2 gear teeth 70 corresponding to a handwheel variation of +/−8.545450.

TABLE 1

| SPEPS | | |
|---|---|---|
| Teeth quantity to skin | | 2 |
| Teeth quantity (gear) | | 72 |
| Gear angle variation | ° | 10 |
| Cfactor | mm/360° | 55 |
| rack travel variation (+/−) | mm | 1.52778 |
| handwheel variation (+/−) | ° | 10 |

TABLE 2

| DPEPS | | |
|---|---|---|
| Teeth quantity to skip | | 2 |
| Teeth quantity (gear) | | 72 |
| Assist gear angle variation | ° | 10 |
| Assist pinion Cfactor | mm/360° | 47 |
| rack travel variation (+/−) | mm | 1.30556 |
| Driver pinion Cfactor | mm/360° | 55 |
| Handwheel angle variation (+/−) | ° | 8.54545 |

Table 3 shows the effects on the variation in handwheel positions of a single-pinion electric power steering (SPEPS) with a plurality of stop positions that are spaced-apart by 1.5 gear teeth 70 on the worm gear 48. Specifically, Table 3 shows stop positions spaced-apart by 1.5 gear teeth 70 corresponding to a handwheel variation of +/−7.5°. Table 4 shows the effects on the variation in handwheel positions of a dual-pinion electric power steering (DPEPS) with a plurality of stop positions that are spaced-apart by 1.5 gear teeth 70 on the worm gear 48. Specifically, Table 4 shows stop positions spaced-apart by 1.5 gear teeth 70 corresponding to a handwheel variation of +/−6.40909°.

TABLE 3

| SPEPS | | |
|---|---|---|
| Teeth quantity to skip | | 1.5 |
| Teeth quantity (gear) | | 72 |
| Gear angle variation | ° | 7.5 |
| Cfactor | mm/360° | 55 |
| rack travel variation (+/−) | mm | 1.14583 |
| handwheel variation (+/−) | ° | 7.5 |

TABLE 4

| DPEPS | | |
|---|---|---|
| Teeth quantity to skip | | 1.5 |
| Teeth quantity (gear) | | 72 |
| Assist gear angle variation | ° | 7.5 |
| Assist pinion Cfactor | mm/360° | 47 |
| rack travel variation (+/−) | mm | 0.97917 |
| Driver pinion Cfactor | mm/360° | 55 |
| Handwheel angle variation (+/−) | ° | 6.40909 |

Choices of the spacing between the plurality of stop positions and the number of stop positions are a tradeoff between handwheel angle variation and effectiveness in reducing wear on the worm gear 48. Worm gear wear can be reduced by using more stop positions and/or stop positions that are spaced farther apart. However, increasing the number and/or spacing between the stop positions results in increased handwheel angle variation, which may result in the EPS system 40 stopping short of a full range of steering travel.

A method for controlling a machine is also provided. The method comprises the steps of: rotating a driveshaft 60 by a motor 19; driving a worm gear 48 by a worm 47 coupled to the driveshaft 60 to cause the worm gear 48 to rotate in a first direction; stopping the motor 19 from rotating the driveshaft 60 in response to the worm gear 48 rotating in the first direction to a given one of a plurality of first stop positions 80a, 80b, 80c; and changing the given one of the first stop positions 80a, 80b, 80c to another one of the first stop positions 80a, 80b, 80c.

In some embodiments, the machine is configured to perform at least one of: applying an assist torque to a steering system 40 of a vehicle, and controlling the steering system 40. For example, the machine may be all or part of an electric power steering (EPS) system 40 of a motor vehicle.

In some embodiments, the step of changing the given one of the first stop positions 80a, 80b, 80c to another one of the first stop positions 80a, 80b, 80c is performed each time the worm gear 48 is driven away from the given one of the first stop positions 80a, 80b, 80c. In some embodiments, the step of changing the given one of the first stop positions 80a, 80b, 80c to another one of the first stop positions 80a, 80b, 80c comprises changing the given one of the first stop positions 80a, 80b, 80c in a predetermined pattern.

In some embodiments, adjacent ones of the first stop positions 80a, 80b, 80c are spaced apart from one another by one gear tooth of the worm gear 48. In some embodiments, adjacent ones of the first stop positions 80a, 80b, 80c are spaced apart from one another by an amount between one and two gear teeth 70 of the worm gear 48. In some embodiments, adjacent ones of the first stop positions 80a, 80b, 80c are spaced apart from one another by two or more gear teeth 70 of the worm gear 48. In some embodiments, adjacent ones of the plurality of first stop positions 80a, 80b, 80c are spaced apart from one another by an amount between one and two gear teeth 70 of the worm gear 48.

In some embodiments, the method for controlling a machine also includes the steps of: driving the worm gear 48 by the worm to cause the worm gear 48 to rotate in a second direction opposite the first direction; stopping the motor from rotating the driveshaft in response to the worm gear 48 rotating in the second direction to a given one of a plurality of second stop positions 82a, 82b, 82c; and changing the given one of the second stop positions 82a, 82b, 82c to another one of the second stop positions 82a, 82b, 82c.

In some embodiments, the step of changing the given one of the second stop positions 82a, 82b, 82c to another one of the second stop positions 82a, 82b, 82c is performed each time the worm gear 48 is driven away from the given one of the second stop positions 82a, 82b, 82c. In some embodiments, the step of changing the given one of the second stop positions 82a, 82b, 82c to another one of the second stop positions 82a, 82b, 82c comprises changing the given one of the second stop positions 82a, 82b, 82c in a predetermined pattern.

In some embodiments, adjacent ones of the second stop positions 82a, 82b, 82c are spaced apart from one another by one gear tooth of the worm gear 48. In some embodiments, adjacent ones of the second stop positions 82a, 82b, 82c are spaced apart from one another by an amount between one and two gear teeth 70 of the worm gear 48. In some embodiments, adjacent ones of the second stop positions 82a, 82b, 82c are spaced apart from one another by two or more gear teeth 70 of the worm gear 48. In some embodiments, adjacent ones of the plurality of second stop positions 82a, 82b, 82c are spaced apart from one another by an amount between one and two gear teeth 70 of the worm gear 48.

A method for controlling a power steering system 40 in a vehicle is also provided. The method comprises the steps of: rotating a driveshaft 60 by a motor 19; driving a worm gear 48 by a worm 47 coupled to the driveshaft 60 to cause the worm gear 48 to rotate in a first direction; stopping the motor 19 from rotating the driveshaft 60 in response to the worm gear 48 rotating in the first direction to a given one of a plurality of first stop positions 80a, 80b, 80c; and changing the given one of the plurality of first stop positions 80a, 80b, 80c to another one of the plurality of first stop positions 80a, 80b, 80c.

In some embodiments, the method for controlling the power steering system 40 also comprises the steps of: driving the worm gear 48 by the worm 47 to cause the worm gear 48 to rotate in a second direction opposite the first direction; stopping the motor 19 from rotating the driveshaft 60 in response to the worm gear 48 rotating in the second direction to a given one of a plurality of second stop positions 82a, 82b, 82c; and changing the given one of the plurality of second stop positions 82a, 82b, 82c to another one of the plurality of second stop positions 82a, 82b, 82c.

The system and method of the present disclosure may provide several advantages over conventional systems and methods for operating machines that include worm gears. The system and method of the present disclosure may prolong the useful life of a worm gear by spreading wear over a larger area of the worm gear. Furthermore, the system and method of the present disclosure may allow for a gear set to apply a higher torque than a gear set using conventional end-of-travel limits. For example, a gear set that is rated for 100 Nm using conventional end-of-travel limits may be rated for 106 Nm using the plurality of software defined end-of travel limits as provided in the system and method of the present disclosure.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A control system for controlling operation of a motor, comprising:
    a processor; and
    memory that includes instructions that, when executed by the processor, cause the processor to:
    energize the motor to rotate a driveshaft coupled to a worm and to thereby drive a worm gear to rotate in a first direction;
    stop the motor from rotating the driveshaft in response to the worm gear rotating in the first direction to or beyond a given one of a plurality of first stop positions each having distinct locations spaced apart from one another;
    energize the motor to drive the worm gear to rotate in a second direction opposite the first direction and away from the plurality of first stop positions; and
    change the given one of the plurality of first stop positions to another one of the plurality of first stop positions to cause the motor to stop rotating the driveshaft in the first direction at or beyond the another one of the plurality of stop positions during a subsequent cycle,
    wherein changing the given one of the plurality of first stop positions to another one of the plurality of first stop positions comprises at least one of: changing the given one of the plurality of first stop positions in a predetermined pattern, or changing the given one of the plurality of first stop positions each time the worm gear is driven away from the given one of the plurality of first stop positions.

2. The control system of claim 1, wherein the instructions, when executed by the processor, further cause the processor to:
    stop the motor from rotating the driveshaft in response to the worm gear rotating in the second direction to or beyond a given one of a plurality of second stop positions; and
    change the given one of the plurality of second stop positions to another one of the plurality of second stop positions.

3. The control system of claim 1, wherein the plurality of first stop positions each correspond to different gear teeth on the worm gear.

4. The control system of claim 1, wherein adjacent ones of the plurality of first stop positions are spaced apart from one another by one or more gear teeth of the worm gear.

5. The control system of claim 1, wherein adjacent ones of the plurality of first stop positions are spaced apart from one another by two or more gear teeth of the worm gear.

6. The control system of claim 1, wherein the plurality of first stop positions includes three different first stop positions.

7. The control system of claim 1, wherein the motor is configured to perform at least one of: applying an assist torque to a steering system of a vehicle, and controlling the steering system.

8. A method for controlling a machine, the method comprising:
- rotating, by a motor, a driveshaft coupled to a worm to thereby drive a worm gear to rotate in a first direction;
- stopping the motor from rotating the driveshaft in response to the worm gear rotating in the first direction to or beyond a given one of a plurality of first stop positions each having distinct locations spaced apart from one another;
- energizing the motor to drive the worm gear to rotate in a second direction opposite the first direction and away from the plurality of first stop positions; and
- changing the given one of the plurality of first stop positions to another one of the plurality of first stop positions to cause the motor to stop rotating the driveshaft in the first direction at or beyond the another one of the plurality of stop positions during a subsequent cycle,
- wherein changing the given one of the plurality of first stop positions to another one of the plurality of first stop positions is performed each time the worm gear is driven away from the given one of the plurality of first stop positions.

9. The method of claim 8, further comprising:
- stopping the motor from rotating the driveshaft in response to the worm gear rotating in the second direction to or beyond a given one of a plurality of second stop positions; and
- changing the given one of the plurality of second stop positions to another one of the plurality of second stop positions.

10. The method of claim 8, wherein adjacent ones of the plurality of first stop positions are spaced apart from one another by one gear tooth of the worm gear.

11. The method of claim 8, wherein adjacent ones of the plurality of first stop positions are spaced apart from one another by an amount between one and two gear teeth of the worm gear.

12. The method of claim 8, wherein adjacent ones of the plurality of first stop positions are spaced apart from one another by two or more gear teeth of the worm gear.

13. The method of claim 8, wherein the plurality of first stop positions includes three different first stop positions.

14. The method of claim 8, wherein the machine is configured to perform at least one of: applying an assist torque to a steering system of a vehicle, and controlling the steering system.

15. A method for controlling a machine, the method comprising:
- rotating, by a motor, a driveshaft coupled to a worm to thereby drive a worm gear to rotate in a first direction;
- stopping the motor from rotating the driveshaft in response to the worm gear rotating in the first direction to or beyond a given one of a plurality of first stop positions each having distinct locations spaced apart from one another;
- energizing the motor to drive the worm gear to rotate in a second direction opposite the first direction and away from the plurality of first stop positions; and
- changing the given one of the plurality of first stop positions to another one of the plurality of first stop positions to cause the motor to stop rotating the driveshaft in the first direction at or beyond the another one of the plurality of stop positions during a subsequent cycle,
- wherein changing the given one of the plurality of first stop positions to another one of the plurality of first stop positions comprises changing the given one of the plurality of first stop positions in a predetermined pattern.

16. The method of claim 15 further comprising:
- stopping the motor from rotating the driveshaft in response to the worm gear rotating in the second direction to or beyond a given one of a plurality of second stop positions; and
- changing the given one of the plurality of second stop positions to another one of the plurality of second stop positions.

17. The method of claim 15, wherein the machine is configured to perform at least one of: applying an assist torque to a steering system of a vehicle, and controlling the steering system.

18. The method of claim 15, wherein adjacent ones of the plurality of first stop positions are spaced apart from one another by one gear tooth of the worm gear.

19. The method of claim 15, wherein adjacent ones of the plurality of first stop positions are spaced apart from one another by an amount between one and two gear teeth of the worm gear.

20. The method of claim 15, wherein the plurality of first stop positions includes three different first stop positions.

* * * * *